(12) United States Patent
Wang et al.

(10) Patent No.: US 8,327,391 B2
(45) Date of Patent: Dec. 4, 2012

(54) METHOD, SYSTEM AND APPARATUS FOR TRANSMITTING REMOTE PROCEDURE CALL COMMANDS

(75) Inventors: Rui Wang, Shenzhen (CN); Haitao Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 396 days.

(21) Appl. No.: 12/758,497

(22) Filed: Apr. 12, 2010

(65) Prior Publication Data

US 2010/0199291 A1 Aug. 5, 2010

Related U.S. Application Data

(63) Continuation of application No. PCT/CN2008/072640, filed on Oct. 10, 2008.

(30) Foreign Application Priority Data

Oct. 10, 2007 (CN) .......................... 2007 1 0162810

(51) Int. Cl.
*G06F 13/00* (2006.01)
(52) U.S. Cl. ........................................ 719/330
(58) Field of Classification Search .................... 719/330
See application file for complete search history.

(56) References Cited

U.S. PATENT DOCUMENTS

| | | | |
|---|---|---|---|
| 6,769,022 B1 * | 7/2004 | DeKoning et al. | 709/223 |
| 7,321,929 B2 * | 1/2008 | Rolfe | 709/223 |
| 7,886,033 B2 * | 2/2011 | Hopmann et al. | 709/223 |
| 2002/0184360 A1 * | 12/2002 | Weber et al. | 709/223 |
| 2006/0236325 A1 | 10/2006 | Rao et al. | |

FOREIGN PATENT DOCUMENTS

CN  1969504 A  5/2007

OTHER PUBLICATIONS

Office Action issued in corresponding European Patent Application No. 08840353.0, mailed Jan. 5, 2012.
"Device Management Requirements—Approved Version 1.2-09" Open Mobile Alliance. Feb. 9, 2007.
"CPE Wan Management Protocol v1.1" Broadband Forum Technical Report. Nov. 2006.
"SyncML Device Management Protocol, Version 1.1.2" Open Mobile Alliance. Dec. 12, 2003.
"Device Management Requirements" Open Mobile Alliance. Feb. 9, 2007.
"OMA Device Management Protocol" Open Mobile Alliance. Jun. 17, 2008.

(Continued)

*Primary Examiner* — Andy Ho
(74) *Attorney, Agent, or Firm* — Brinks Hofer Gilson & Lione

(57) ABSTRACT

A method, system and apparatus for transmitting remote procedure call (RPC) commands are disclosed so that all terminals can be managed by using a protocol or specification in a converged network. The method includes: setting RPC commands in device management (DM) specification information; and transmitting the DM specification information. The system includes: a first device, adapted to: set RPC commands in the DM specification information, and send the DM specification information to a second device; and the second device, adapted to receive the DM specification information from the first device. The apparatus includes a terminal device and a DM server.

5 Claims, 2 Drawing Sheets

OTHER PUBLICATIONS

"CPE WAN Management Protocol v1.1" The Broadband Forum. Nov. 2006.

Written Opinion of the International Searching Authority issued in corresponding PCT Application No. PCT/CN2008/072640; mailed Jan. 15, 2009.

Office Action issued in corresponding Chinese Patent Application 200710162810.7; issued Jun. 7, 2010.

Extended European Search Report issued in corresponding European Patent Application No. 08840353.0, mailed May 10, 2011.

Open Mobile Alliance, "Converged DM BoF", OMA-BOF-CDM_Final_Report-V1_0-20071213-A. London, United Kingdom, Dec. 13, 2007. XP-002634043.

Open Mobile Alliance, "Management Content Convergence", OMA-CDM-2007-0023-INP_Management_Content. Oct. 4, 2007. XP-002634045.

Open Mobile Alliance, "OMA Device Management Protocol", OMA-TS-DM_Protocol-V1_2-20070209-A. Approved Version 1.2, Feb. 9, 2007. XP-002634038.

The Broadband Forum, "CPE WAN Management Protocol", TR-069. Issue 1, Amendment 1, Nov. 2006. XP-002550467.

Srinivasan, R. "RPC: Remote Call Protocol Specification Version 2" Network Working Group.(Aug. 1995):1-18.

Thurlow, Robert "RPC: Remote Call Protocol Specification Version 2" Network Working Group. (Dec. 2006):1-26.

Search Report issued in corresponding PCT Application No. PCT/CN2008/072640; mailed Jan. 15, 2009.

* cited by examiner

METHOD, SYSTEM AND APPARATUS FOR TRANSMITTING REMOTE PROCEDURE CALL COMMANDS

CROSS-REFERENCE TO RELATED APPLICATIONS

This application is a continuation of International Patent Application No. PCT/CN2008/072640, filed on Oct. 10, 2008, which claims priority to Chinese Patent Application No. 200710162810.7, filed on Oct. 10, 2007, both of which are hereby incorporated by reference in their entireties.

FIELD OF THE INVENTION

The present invention relates to the communication field, and in particular, to a method, system and apparatus for transmitting remote procedure call commands.

BACKGROUND OF THE INVENTION

The Open Mobile Alliance Device Management (OMA DM) working group has formulated a unified DM specification. In this specification, a third party (for example, a mobile operator, a service provider or an information management department of a partner) manages and sets environment and configuration information in a terminal device (for example, a mobile terminal device and a functional object in the terminal device) by using a device management (DM) server to solve problems of the customer premises equipment (CPE) during the use. The DM server and the terminal device form a DM system, in which the DM server may manage and set the terminal device in the over-the-air (OTA) mode, for example, installation and upgrade of software and firmware, to provide personalized services and improve the user experience.

In the DM system, a DM agent in the terminal device is used to interpret and execute management commands sent by the DM server. A DM tree stored in the terminal device may be considered as an interface for the DM server to manage the terminal device over the DM protocol, where the DM tree includes some basic management objects (MOs). The DM server controls the terminal device through MO operation commands, including Get, Replace, Exec, Copy, and Delete.

The Digital Subscriber Line (DSL) Forum defines a CPE WAN Management Protocol (CWMP). The CWMP is used in a DSL network environment to implement functions similar to the OMA DM. In the DSL network environment, an auto-configuration server (ACS) communicates with the terminal device in bidirectional mode through remote procedure call (RPC) commands to implement remote management. The CPE stores various data models for maintaining functional parameters in the CPE.

Generally, the OMA DM specification is used in radio environments, while the CWMP is used in fixed network environments. With the development of radio communication technologies such as wireless fidelity (WIFI) and worldwide interoperability for microwave access (WIMAX), services are provided through fixed networks although these communication technologies provide mobile functions through radio channels. Thus, during the implementation of the present invention, the inventor discovers that when radio communication modes such as WIFI, WIMAX and WCDMA are converged, no unified protocol or specification is available to manage all terminals in a converged network because terminals in different networks use different management specifications.

SUMMARY OF THE INVENTION

Embodiments of the present invention provide a method, system and apparatus for transmitting remote procedure call (RPC) commands to manage all terminals by using a protocol or specification in a converged network.

A method for transmitting RPC commands in an embodiment of the present invention includes:
setting RPC commands in device management (DM) specification information; and
transmitting the DM specification information.

A system for transmitting RPC commands in an embodiment of the present invention includes a first device and a second device, where:
the first device is adapted to: set RPC commands in DM specification information, and send the DM specification information to the second device; and
the second device is adapted to receive the DM specification information sent from the first device.

A DM system provided in an embodiment of the present invention includes a first device and a second device, where:
the first device is adapted to: set RPC commands in DM specification information, and send the DM specification information to the second device; and
the second device is adapted to: receive the DM specification information from the first device, and execute the RPC commands carried in the DM specification information.

A DM server provided in an embodiment of the present invention includes:
a setting unit, adapted to set RPC commands in DM specification information; and
a transmitting unit, adapted to transmit the DM specification information.

A terminal device provided in an embodiment of the present invention includes:
a receiving unit, adapted to receive DM specification information that carries RPC commands; and
a processing unit, adapted to execute the RPC commands carried in the DM specification information received by the receiving unit.

According to embodiments of the present invention, the RPC commands are set in the DM specification information and sent to the terminal device, so that these RPC commands can be executed by the terminal device. Thus, the OMA DM specification is used to manage terminals based on CWMP data models and all terminals in a converged network. In embodiments of the present invention, because the RPC commands are set in the DM specification information and sent to the terminal device, the OMA DM may be used to manage all terminals in the converged network. Therefore, it is unnecessary to develop a special protocol or specification to manage all terminals in the converged network, thus saving development costs.

DETAILED DESCRIPTION OF THE EMBODIMENTS

For better understanding and implementation of the present invention by those skilled in the art, the following describes embodiments of the present invention with reference to the accompanying drawings.

In embodiments of the present invention, to enable the DM server to manage terminal devices in the CWMP system by using the OMA DM specification, it is necessary to transmit RPC commands between the DM server and the terminal devices. That is, the DM server sends a command based on CWMP data models (for example, an RPC command) to the terminal devices by using the OMA DM specification information (hereinafter referred to as the DM information); the terminal devices return the command execution result to the DM server by using the OMA DM specification.

An embodiment of the present invention provides an overall method for transmitting RPC commands according to the preceding description.

Figure 1:
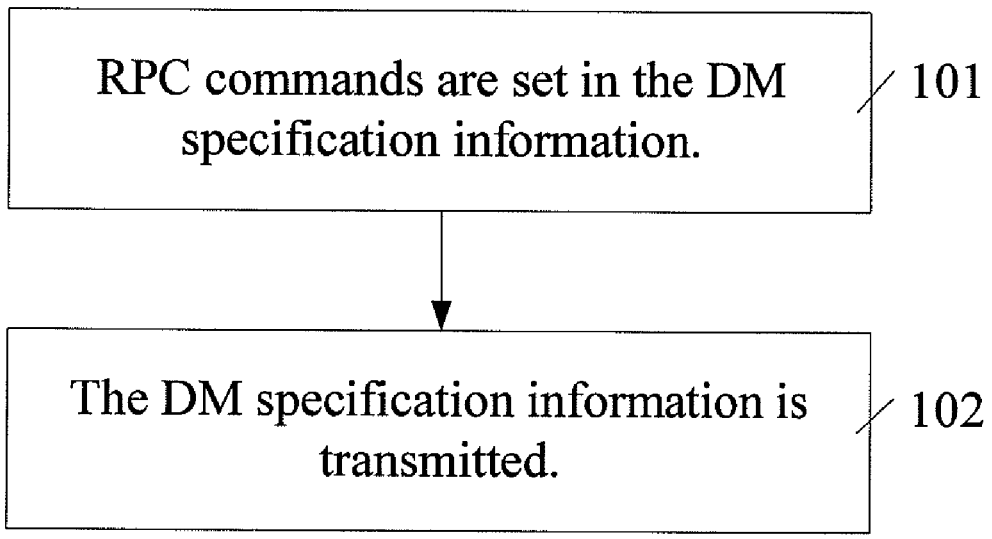
FIG. 1 is a flowchart of an overall method for transmitting RPC commands according to an embodiment of the present invention.

FIG. 1 is a flowchart of an overall method for transmitting RPC commands in an embodiment of the present invention.

101. The RPC commands are set in DM specification information.

102. The DM specification information is transmitted.

The following embodiments describe a method for transmitting RPC commands by using the OMA DM specification. In the first embodiment, a method for transmitting RPC commands by extending DM commands (for example, an Alert command) is provided; in the second embodiment, a method for transmitting RPC commands through a specific DM MO is provided; in the third embodiment, a method for transmitting RPC commands by extending a DM command set is provided.

Embodiment 1

This embodiment describes a method for transmitting RPC commands by extending DM commands. The following takes the Alert command as an example to describe the method for transmitting RPC commands. The document type data (DTD) of the Alert command is as follows:

Alert (CmdID, Data?, Correlator?, Item*)

where, "CmdID" is an ID of a command defined by the DM specification during transmission; "Data" indicates the type of the Alert command; "Item" indicates the content of the Alert command. For example, if Data=1100, the data is a displaying message. When a terminal device receives this message, the terminal device displays the content of the Item to the user. "Correlator" indicates a correlation value associated with an Alert command that carries an RPC command. When the RPC command can obtain the execution result only after a certain period of time, the peer end may use the value of the "Correlator" to reply to the RPC command, indicating that the reply is given to the RPC command associated with the value of the "Correlator".

To carry an RPC command in the Alert command, an Alert code (RPC command code) needs to be allocated for each RPC command. The Alert code is set in the Date element so that the peer end can identify what RPC command is carried in the Alert command. Then, the RPC command parameters are carried in the Item. The parameters may be described through an extensible markup language (XML). In this way, after receiving the Alert command, the peer end may determine the RPC command and parameters carried in the Alert command. Then, the peer end executes the RPC command and replies to the Alert command through a Status command, a Results command or an Alert command defined in the DM specification, with the reply parameters carried in the Item of the Status command, Results command or Alert command.

An example of carrying an RPC command in the Alert command is given below.

The RPC command is "GetParameterNames", which is used to obtain names of some parameters in the data models of a terminal device. The command has two parameters: one is "ParameterPath", which indicates a path for obtaining the parameters of the data models, so that the terminal device can find these parameters according to the path; the other is "NextLevel", which indicates whether to obtain next level directories of the path and is a Boolean value. A value "ParameterInfoStruct" is returned upon command execution. The value is a composite value and includes two parameters: "Name" and "Writable". "Name" is the parameter name, and "Writable" indicates whether a value may be assigned to the parameter. If the parameter is a child object, "Name" indicates whether the child object may be deleted.

The DM server sends an Alert command to the terminal device, carrying the name and parameter of the RPC command in the Item/Data parameter of the Alert command. The following shows the Alert command:

```
<Alert>
    <CmdID>3</CmdID>
    <Data>1248</Data>
    <Item>
        <Type xmlns="syncml:metinf">application/
        dsl.cwmp.rpc</Type>
        <Format xmlns="syncml:metinf">xml</Format>
        <Data>
    <rpc:ParameterPath>InternetGatewayDevice.LANDevice.1.Hosts.-
    </rpc:ParameterPath>
        </Data>
    </Item>
    <Item>
        <Type xmlns="syncml:metinf">application/
        dsl.cwmp.rpc</Type>
        <Format xmlns="syncml:metinf">xml</Format>
        <Data>
            <rpc:NextLevel>true</rpc:NextLevel>
        </Data>
    </Item>
</Alert>
``` where, "rpc" is a predefined space for the name, indicating how to parse parameters such as "ParameterPath" and "NextLevel".

In the Alert command, "1248" is an Alert code, indicating that the Alert command is used in the "GetParameterNames" command of the RPC message. The two "Items" include the two parameters (that is "ParameterPath" and "NextLevel") of the command. Because NextLevel=true, the terminal device may return a parameter name in the next level of the path specified in the "ParameterPath" parameter by using the Status command or Results command.

```
Status
    <MsgRef>2</MsgRef><CmdRef>3</CmdRef>
    <CmdID>2</CmdID>
    <Cmd>Alert</Cmd>
    <Data>200</Data>
    <Item>
        <Type xmlns="syncml:metinf">application/dsl.cwmp.rpc</
        Type>
        <Format xmlns="syncml:metinf">xml</Format>
        <Data>
            <rpc:ParameterList>
```

```
<rpc:Name>InternetGatewayDevice.LANDevice.1.Hosts.HostNumber-
OfEntries
        </rpc:Name>
        <rpc:Writable>true</rpc:Writable>
    </rpc:ParameterList>
    <rpc:ParameterList>
        <rpc:Name>
InternetGatewayDevice.LANDevice.1.Hosts.Host.</rpc:Name>
        <rpc:Writable>false</rpc:Writable>
    </rpc:ParameterList>
  </Data>
</Item>
Status
```

The above Status command is used to reply to the "GetParameterNames" command. "200" indicates that the command execution is successful. The returned result is stored in "Item", which indicates that there are two parameters in the path specified by the Alert command. One is "HostNumberOfEntries", which may be assigned with a value, and the other is "Host.", where "." indicates that it is a child object including other parameters. The child object cannot be deleted.

This example presents a method for transmitting an RPC command by using the Alert command.

The following describes a similar solution by setting a specific Alert Code (that is, RPC ID) to "1240". The Alert ID may be set in the Data element of the Alert command to indicate that the Alert command is used specifically for carrying an RPC command. The RPC command related information, including the command name and parameters, are set in "Item". The following contents in "Item" represent the RPC command in the preceding example:

```
<Item>
    <Type xmlns="syncml:metinf">application/dsl.cwmp.rpc</Type>
    <Format xmlns="syncml:metinf">xml</Format>
    <Data>
        <rpc:GetParameterNames>
    <rpc:ParameterPath>InternetGatewayDevice.LANDevice.1.Hosts.-
</rpc:ParameterPath>
            <rpc:NextLevel>true</rpc:NextLevel>
        </rpc:GetParameterNames>
    </Data>
</Item>
```

After receiving the message, the terminal device knows that the message is an RPC command according to "1240", and obtains the command content from "Item". After executing the RPC command, the terminal device returns the execution result by using the Status command, Results command or Alert command.

What has been described is a method for transmitting an RPC command by using the Alert command. Similarly, the RPC command may also be transmitted by using other DM commands.

Embodiment 2

Figure 2:
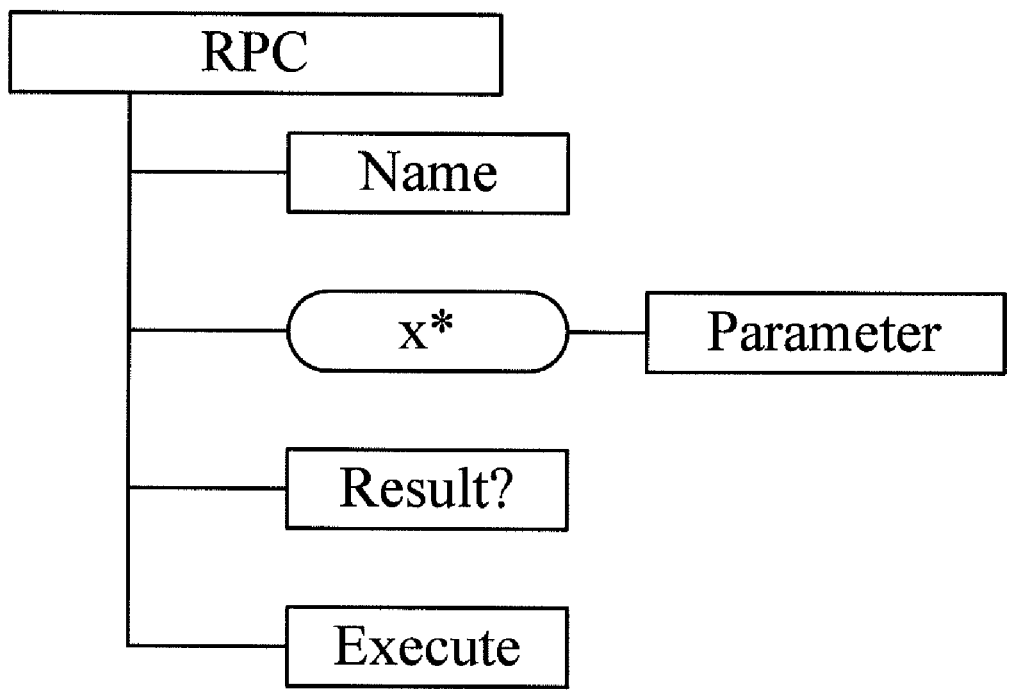
FIG. 2 shows a structure of a DM object according to a second embodiment of the present invention.
Figure 3:
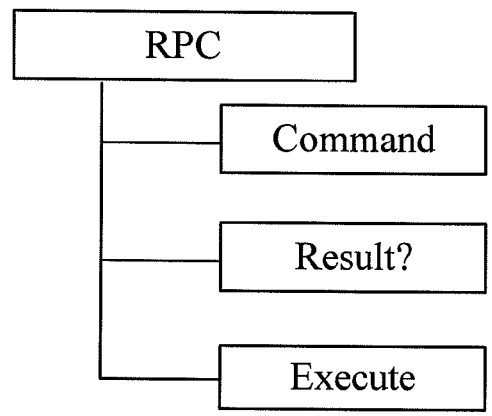
FIG. 3 shows a structure of another DM object according to the second embodiment of the present invention.

The following defines a new DM MO in the OMA DM specification, where the DM MO is referred to as an RPC MO. The RPC MO can be used to transmit RPC commands. FIG. 2 and FIG. 3 show organizational structures of two RPC MOs. In FIG. 2, the RPC command and its parameters may be located in different nodes; that is, the RPC command is represented by an RPC command ID, while the RPC parameters are described in XML mode. The RPC command ID may be an RPC command name or an ID similar to the Alert code provided in the first embodiment. The RPC MO shown in FIG. 3 stores the whole RPC command in the same node, which is described in XML mode. After the terminal device obtains the RPC command, for the structure shown in FIG. 2, the terminal device may find a module that executes the command according to the RPC command ID, and transmit related parameters; for the structure shown in FIG. 3, after the terminal device obtains the RPC command, the terminal device needs to parse the command description and extract a command ID and parameters from the command. Then, a module executes the command.

Two nodes are available in the RPC MO: Result and Execute. The Result node is used to store the RPC command execution result, and the Execute node is used to trigger the execution of the RPC command.

An example of transmitting RPC commands is given below.

The server configures the RPC MO by using the structure shown in FIG. 2. The server sets "Name" to "GetParameterNames" or an ID value (for example, "1248") to represent the command. Then, the server sets "ParameterPath" and "NextLevel" in the RPC/X/Parameter node as follows:

```
<rpc:ParameterPath xmlns:rpc="syncml:metinf">
    InternetGatewayDevice.LANDevice.1.Hosts.
</rpc:ParameterPath>
<rpc:NextLevel>true</rpc:NextLevel>
```

If the server configures the RPC MO by using the structure shown in FIG. 3, the whole RPC command is stored in the Command node, for example:

```
<rpc:GetParameterNames xmlns:rpc="syncml:metinf">
    <rpc:ParameterPath>InternetGatewayDevice.LANDevice.1.Hosts.-
</rpc:ParameterPath>
        <rpc:NextLevel>true</rpc:NextLevel>
</rpc:GetParameterNames>
```

After the server configures the RPC command information, the server executes the Execute node. The terminal device executes the command and records the execution result (code in the Item/Data of the Status command provided in the first embodiment) in the Result node. The server may obtain the RPC execution result through the following two modes: First, the RPC execution result is carried in the reply message of the Exec command, so that the server may obtain the RPC execution result from the "Item" element of the Status command; second, only a 200 OK message is returned, so that the server obtains the RPC execution result by getting the Result node. That is, after receiving a 200 OK reply, the server sends a Get command to obtain the content of the Result node.

```
<Get>
    <CmdID>5</CmdID>
    <Item>
        <Target><LocURI>./RPC/Result</LocURI></Target>
    </Item>
</Get>
```

After receiving the command, the terminal device sends the content stored in the Result node to the server.

Embodiment 3

This embodiment describes a method for transmitting RPC commands by extending a DM command set. That is, RPC commands are added to the DM command set. In this case, the DM server may treat the DM commands as RPC commands, and easily transmit RPC commands to the terminal. In the DM command set, commands other than the Alert command are specific to the DM tree. The RPC commands include operations on data models and devices. Thus, some DM commands similar to the Alert command may be designed to transmit the RPC commands. The following shows the DTD of an RPC command:

RPCCommand (CmdID, Correlator?, Item*)

where, "RPCCommand" indicates the RPC command ID; "CmdID" indicates the ID of each command defined by the DM specification during transmission; in the case of asynchronous operations, for example, when an RPC Download command is sent, the Status reply does not include the command execution result because no immediate reply is available. Thus, it is necessary to use "Correlator" to notify the server which RPC command is associated with the execution result; "Item" is a parameter of the RPC command.

The method for transmitting RPC commands in this embodiment is similar to that provided in Embodiment 1 except for the following difference: In Embodiment 1, an Alert code (for example, an Alert code in Data) may be used to differentiate RPC commands; in this embodiment, a command ID is used to differentiate RPC commands. The method for transmitting RPC commands is similar to that provided in Embodiment 1, and will not be further described.

In Embodiment 1 to 3, after receiving the DM specification information that includes RPC commands from the DM server, the terminal device may execute the RPC commands in the DM specification information, so that the DM server can manage the terminal device. The DM specification information includes one of the following or any combination thereof: an existing DM command, a DM object, and a new DM command.

Embodiment 4

Figure 4:
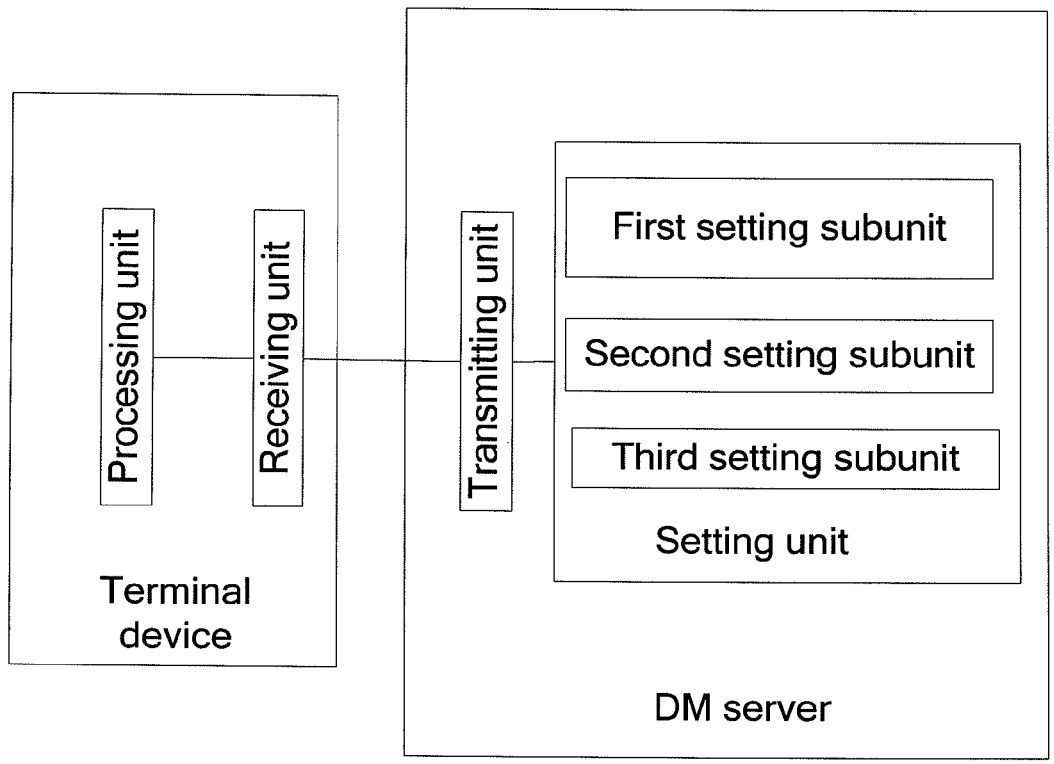
FIG. 4 shows a system for transmitting RPC commands according to a fifth embodiment of the present invention.

As shown in FIG. 4, a system for transmitting RPC commands in an embodiment of the present invention includes: a first device, adapted to: set RPC commands in DM specification information, and send the DM specification information to a second device; and the second device, adapted to receive DM specification information of the first device. The first device includes a DM server or a terminal device, and the second device includes a DM server or a terminal device. In FIG. 4, the first device is a DM server and the second device is a terminal device.

A DM system provided in an embodiment of the present invention includes: a first device, adapted to: set RPC commands in DM specification information, and send the DM specification information to a second device; and the second device, adapted to: receive DM specification information of the first device, and execute the DM specification information. The first device includes a DM server or a terminal device, and the second device includes a DM server or a terminal device.

A DM server provided in an embodiment of the present invention includes: a setting unit, adapted to set RPC commands in DM specification information; and a transmitting unit, adapted to transmit the DM specification information. The DM specification information includes one of the following or any combination thereof: an existing DM command, a DM object and a new DM command. The setting unit includes one of the following subunits or any combination thereof: a first setting subunit, adapted to set an RPC command in an existing DM command; a second setting subunit, adapted to set an RPC command in a DM object; and a third setting subunit, adapted to set an RPC command in a new DM command.

A terminal device provided in an embodiment of the present invention includes: a receiving unit, adapted to receive DM specification information; and a processing unit, adapted to: process the DM specification information received by the receiving unit, and return the execution result to the DM server, so that the DM server can manage the terminal device.

According to embodiments of the present invention, the DM server can send the RPC commands to the terminal device for execution, so that some CWMP-based data models may be reused in the OMA DM system.

What has been described is a method, system and apparatus for transmitting RPC commands. Although the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A non-transatory computer-readable medium comprising instructions, which, when executed by a computer, cause the computer to perform a method for transmitting remote procedure call (RPC) commands, the method comprising:
    setting RPC commands in OMA device management (DM) specification information; and
    transmitting the OMA DM specification information,
    wherein the OMA DM specification information comprises an existing DM command, where the existing DM command is an alert command,
    wherein the alert command comprises an RPC command code and RPC command parameters, where the RPC command code is associated with an RPC command, and
    wherein setting RPC commands in the DM specification information comprises:
    setting an RPC command code in a data element of the alert command; and
    setting the RPC command parameters in an item element of the alert command.

2. The non-transatory computer-readable medium of claim 1, wherein the OMA DM object further comprises:
    a result parameter adapted to store an RPC command execution result; and
    a command execution node adapted to trigger execution of the RPC command.

3. The method of claim 1, wherein after transmitting the OMA DM specification information, the method further comprises:
    executing, by a terminal device, RPC commands in the OMA DM specification information.

4. A device management (DM) server device, comprising:
    a setting unit adapted to set remote procedure call (RPC) commands in OMA DM specification information; and
    a transmitting unit adapted to transmit the OMA DM specification information,
    wherein the OMA DM specification information comprises an existing DM command, where the existing DM command is an alert command,
    wherein the alert command comprises an RPC command code and RPC command parameters, where the RPC command code is associated with an RPC command, and
    wherein setting RPC commands in the DM specification information comprises:

setting an RPC command code in a data element of the alert command; and setting the RPC command parameters in an item element of the alert command.

5. A terminal device, comprising:

a receiving unit adapted to receive OMA device management (DM) specification information that carries remote procedure call (RPC) commands; and a processing unit adapted to execute the RPC commands carried in the OMA DM specification information received by the receiving unit, wherein the OMA DM specification information comprises an existing DM command, where the existing DM command is an alert command, wherein the alert command comprises an RPC command code and RPC command parameters, where the RPC command code is associated with an RPC command, and wherein setting RPC commands in the DM specification information comprises:

setting an RPC command code in a data element of the alert command; and setting the RPC command parameters in an item element of the alert command.

* * * * *